United States Patent [19]

Murray

[11] Patent Number: 5,287,988
[45] Date of Patent: Feb. 22, 1994

[54] METAL-LINED PRESSURE VESSEL

[75] Inventor: Cornelius F. Murray, Lincoln, Nebr.

[73] Assignee: Brunswick Corporation, Lake Forest, Ill.

[21] Appl. No.: 12,932

[22] Filed: Feb. 3, 1993

[51] Int. Cl.$^5$ .............................................. B65D 25/00
[52] U.S. Cl. ..................................... 220/589; 220/590
[58] Field of Search ............... 220/586, 588, 589, 590, 220/465

[56] References Cited

U.S. PATENT DOCUMENTS

| | | | |
|---|---|---|---|
| 2,372,800 | 4/1945 | Stearns | 220/586 |
| 3,031,099 | 4/1962 | Wiltshire | 220/590 |
| 3,132,761 | 5/1964 | Sylvester | 220/590 |
| 3,137,405 | 6/1964 | Gorcey | 220/3 |
| 3,508,677 | 4/1970 | Laubson et al. | 220/3 |
| 3,815,773 | 6/1974 | Duvall et al. | 220/3 |
| 3,843,010 | 10/1974 | Morse et al. | 220/590 |
| 3,907,149 | 9/1975 | Harmon | 220/590 |
| 3,920,047 | 11/1975 | Mercier | 138/30 |
| 4,167,201 | 9/1979 | Zahid | 138/30 |
| 4,317,472 | 3/1982 | Zahid | 138/30 |
| 4,360,116 | 11/1982 | Humphrey | 220/3 |
| 4,369,894 | 1/1983 | Grover et al. | 220/414 |
| 4,438,858 | 3/1984 | Grover | 220/3 |
| 4,846,364 | 7/1989 | Boe | 220/5 A |
| 4,925,044 | 5/1990 | Hembert | 220/3 |

Primary Examiner—Steven M. Pollard
Attorney, Agent, or Firm—Wood, Phillips, VanSanten, Hoffman & Ertel

[57] ABSTRACT

A metal lined pressure vessel has a filament wound shell with a curved polar end. The shell has polar opening, and a metal internal liner is substantially surrounded by the shell and has an opening aligned with the polar opening in the shell. A boss or fitting is disposed at the polar end and has a tubular neck projecting through the opening in the shell and an annular flange which extends radially from an inner end of the neck within the vessel. A shear stress relieving layer is bonded between the boss and the metal liner to relieve stresses induced when the vessel is pressurized, and the liner is affixed to the boss continuously about the opening in the liner for isolating the layer from fluid in the vessel.

15 Claims, 2 Drawing Sheets

METAL-LINED PRESSURE VESSEL

BACKGROUND OF THE INVENTION

1. Technical Field

This invention generally relates to filament wound vessels and, more particularly, to metal lined high pressure vessels having an improved structural interface between a metal liner and a polar boss.

2. Background Art

It generally is known that resin impregnated filament wound vessels are capable of withstanding high internal pressures at weight to volume times pressure relationships considerably less than all metal pressure vessels. However, solely filament wound vessels have proven to be too porous to satisfy the criteria required by many military and commercial applications. One approach to solving the problem of unacceptable porosity in a filament wound pressure vessel is to use a metal internal liner. A satisfactory metal lined pressure vessel is disclosed in U.S. Pat. No. 3,843,010, issued Oct. 22, 1974, and owned by the assignee of this invention.

In a metal lined pressure vessel of the character described in the U.S. Pat. No. 3,843,010, a plurality of layers of filaments form an outer shell and are wound about a fitting or boss disposed in an opening in the vessel. The liner is connected to the fitting internally of the shell to prevent leakage between the outer shell and the liner and to prevent leakage through the opening.

Filament wound vessels often are constructed in a spherical or cylindrical shape with generally spherical ends. Due to the rounded geometry of the ends of a pressure vessel in which a polar boss is disposed, cyclic pressurization and depressurization of the vessel causes relative movement between the liner and the boss. Because the liner is impermeably connected to the boss, that is, because the liner necessarily is connected to the boss in such a way that fluid is prevented from escaping from the vessel, the relative movement induces shear stress and fatigue in the liner and can prematurely destroy the vessel.

One approach to joining a metal liner to a polar boss is to bond a ply of resilient material (a shear layer) between the liner and the boss to provide a flexible seal which offers acceptable levels of strain deformation and fatigue cycle life. A bonded shear layer joint of this type is disclosed in the U.S. Pat. No. 3,843,010 discussed above, wherein a pliable interface layer transfers load from the metal liner to a boss. While such a "shear-slip" interface joint is satisfactory for containing many materials, however, exposure of resilient materials such as rubber to many reactive gases and liquids can degrade the integrity of the seal and render this type of design unsuitable for long term storage applications or where very low leakage rates are required.

As an alternative to connecting a metal liner to a polar boss with a resilient shear stress relieving layer, it has been proposed to integrate a metal liner directly with a polar boss, as shown in U.S. Pat. No. 3,815,7773, issued Jun. 11, 1974, and also owned by the assignee hereof. Although integral liners effectively contain gases and corrosive liquids for extended periods of time, such vessels do not afford the high fatigue cycle life inherent in bonded shear layer joint. In addition, the cost of manufacturing unitary metal liners and polar bosses far exceeds the costs incurred in producing liners suitable for use in a bonded shear layer design.

The present invention is directed toward overcoming the above mentioned problems by providing a unique structural interface in a metal lined pressure vessel which exhibits the structural and cost advantages of a bonded shear layer design together with the permeation integrity of a pressure vessel which has an integral metal liner and polar boss.

SUMMARY OF THE INVENTION

It is an object of the present invention, therefore, to provide a metal lined pressure vessel having an improved structural interface between a metal liner and a polar boss in a rounded end dome section of the vessel.

In the exemplary embodiment of the invention, a pressure vessel may be spherical in shape or cylindrical with domed end closures. In either case reinforcement windings are wrapped around an axis which serves as the "polar" center of revolution in the vessel. The filament wound shell has an opening in the polar end, and a metal internal liner is substantially surrounded by the shell and has an opening aligned with the polar opening in the shell. A boss or fitting is disposed at the polar end and has a tubular neck projecting through the opening in the shell and an annular flange which extends radially from an inner end of the neck within the vessel. A shear ply member is bonded between the boss and the metal liner to dampen deformations and relieve stresses induced when the vessel is pressurized, and the liner is integrally affixed directly to the inside diameter of the boss and isolates the shear layer from fluid in the vessel.

In the disclosed embodiment, the radially extending flange of the polar boss has an outer surface for reinforcing the perimeter of the opening in the shell and a stepped inner surface at the inside surface of the boss. The perimeter of the opening in the metal liner is seated on the stepped inner surface and the liner is welded to the boss to provide an impermeable seal for preventing the escape of reactive fluid from the vessel.

A second step on the flange inner surface and the affixed metal liner define a radially opening annular recess around the periphery of the flange for receiving the shear layer. The shear layer is adhesively bonded in the recess between the liner and the flange and preferably consists of an elastomeric material, such as rubber or film adhesive, to establish a pliable connection suitable for permitting relative movement between the liner and the boss.

Additional stress relief is provided by positioning a portion of the shear layer between the outer surface of the flange and the filament wound shell.

In a modified embodiment of the invention, the metal liner has an annular arcuate groove which circumscribes the perimeter of the opening in the liner. The groove defines a hinge about which the liner will flex when the vessel is pressurized to minimize the transfer of load to the weld joint.

Other objects, features and advantages of the invention will be apparent from the following detailed description taken in connection with the accompanying drawings.

BRIEF DESCRIPTION OF THE DRAWINGS

The features of this invention which are believed to be novel are set forth with particularity in the appended claims. The invention, together with its objects and advantages, may be understood from the following description taken in conjunction with the accompanying drawings, in which like reference numerals identify like elements in the figures and in which:

DETAILED DESCRIPTION OF THE INVENTION

Figure 1:
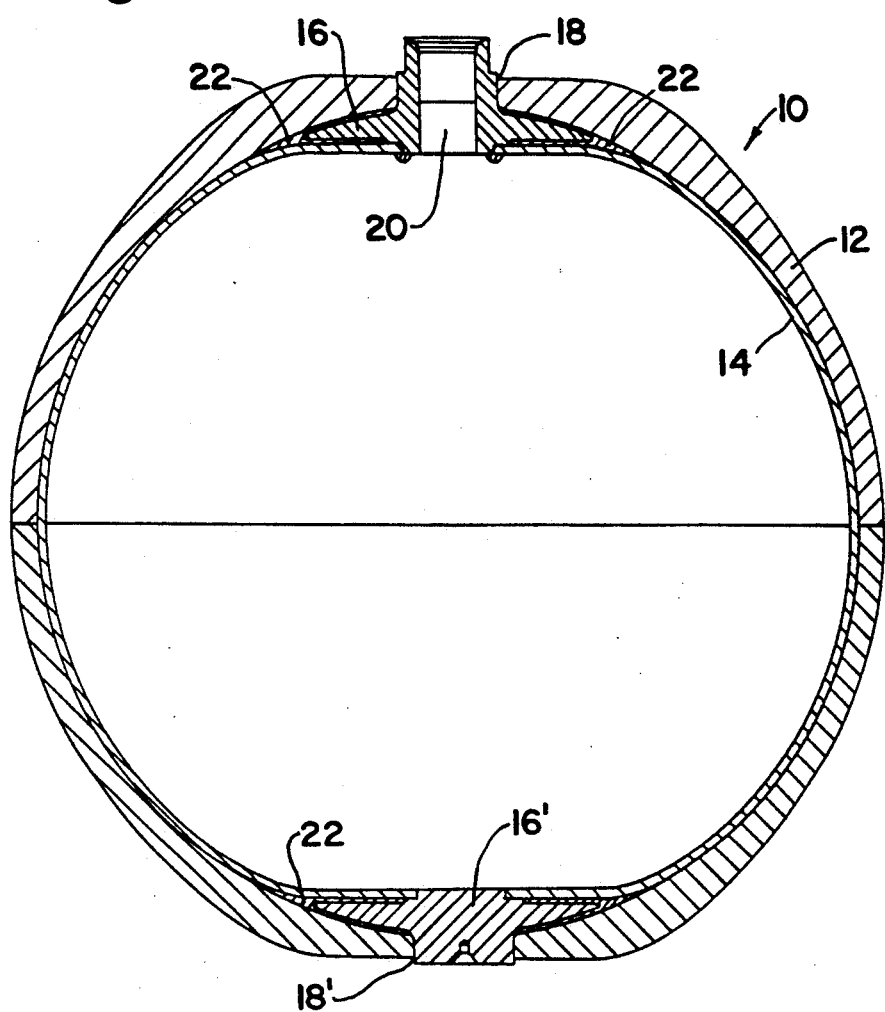
FIG. 1 is sectional view of a metal lined pressure vessel which incorporates the features of the present invention.

FIG. 1 illustrates a substantially spherical, axisymmetric pressure vessel, generally designated 10. As noted previously, however, the present invention also envisions a cylindrical vessel with closed dome ends. The pressure vessel has a composite housing defined by a fiber reinforced outer shell 12 and a metal internal liner 14. A fitting or boss 16 extends outwardly through a polar opening 18 formed in outer shell 12 and defines a pressurization port 20 through which fluid at high pressure may be communicated with the interior of pressure vessel 10. A thin resilient shear accommodating layer 22 is interposed between outer shell 12, boss 16 and metal liner 14 to prevent the infliction of permanent damage to the shell and liner during pressurization of the vessel, as will be described hereafter.

A solid boss 16' extends outwardly through a polar opening 18' formed in the outer shell axially opposite polar opening 18. In the manner described below with respect to the structural interface at polar opening 18, a thin resilient shear accommodating layer 22 is interposed between composite shell 12, polar boss 16' and metal liner 14.

Outer shell 12 is fabricated of a generally known composite reinforcement made of fiber reinforcing material in a resin matrix. The fiber may be fiberglass, ARAMID, carbon, graphite, or any other generally known fibrous reinforcing material. The resin matrix may be epoxy, polyester, vinylester, thermoplastic or any other suitable resinous material capable of providing the structural integrity required for the particular application in which the vessel is to be used.

Figure 2:
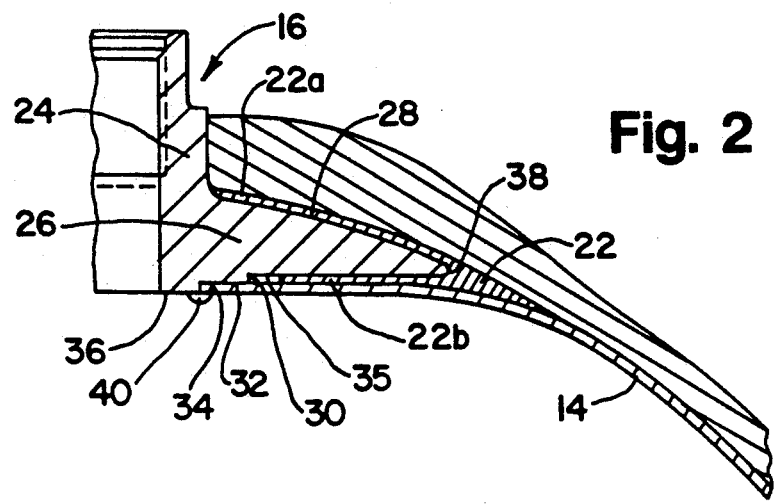
FIG. 2 is an enlarged fragmentary sectional view of the connection between the polar boss, the filament wound shell and the metal liner.

As shown in greater detail in FIG. 2, polar boss 16 has an axial neck 24 projecting outwardly through polar opening 18 in outer composite shell 12. An annular support flange 26 radiates from the neck immediately within the pressure vessel and has an outer surface 28 for distributing pressurization loads about the perimeter of polar opening 18 when vessel 10 is pressurized. That is, support flange 26 has a diameter sufficient to prevent damage to the outer shell when pressurized fluid is admitted into the vessel through pressurization port 20.

Polar boss 16 has an inner surface 30 axially opposite outer surface 28 and which provides a site for attaching metal liner 14 and shear layer 22 to the boss. More particularly, the inner surface has a pair of axially offset annular grooves which define a step 32 for seating the perimeter 34 of an opening in the liner, and a step 35 for seating shear layer 22. Step 32 is axially offset from the inner end of neck 24 a distance substantially equal to the thickness of metal liner 14 whereby the inner surface of the liner is tangentially aligned with the axially inner end surface 36 of neck 24. Shear layer 22 has a pair of divergent leaves 22a and 22b, with leaf 22a being interposed between outer surface 28 of support flange 30 and the inner surface of composite shell 12, and leaf 22b being disposed in the annular recess defined between liner 14 and step 30.

Shear layer 22 preferably is natural or synthetic elastomer or thermo-plastic made from materials including but not limited to chlorobutyl rubber, butyl rubber, natural styrene, silicone rubber, polyvinylchloride, polyisoprene, polybutadiene, film adhesive and nitrile. First interface means in the form of leaf 22a on shear layer 22 is adhesively bonded to outer surface 28 of flange 26 and to the interior of composite shell 12. Second interface means in the form of leaf 22b on shear layer 22 is adhesively bonded to inner surface 30 of flange 26 and to the interior of the perimeter of the opening in metal liner 34. In addition, shear layer 22 extends radially outward of the peripheral edge 38 on flange 26 and defines third interface means directly between composite shell 12 and metal liner 14.

The resilient character of shear layer 22 provides a pliable connection between the metal liner and polar boss 16 to accommodate relative movement between those components during pressurization and depressurization of pressure vessel 10. That is, shearing stresses induced at the interface between the metal liner and the polar boss are relieved by permitting relative movement between the boss and the liner.

Metal liner 34 is integrally affixed to polar boss 16 by means of a weld joint 40 adjacent axial inner end 36 of neck 24 and radially inward of shear layer 22. Due to the generally known permeation integrity of a weld joint, weld joint 40 effectively isolates shear layer 22 from fluids contained in the pressure vessel. Consequently, the invention permits the use a resilient material in shear layer 22 which affords optimal structural performance (i.e., an optimal cycle fatigue life) and the selection of which is independent of the risks associated with exposing the shear layer to corrosive gases or liquids. Also, the shear layer serves to transfer pressurization loads from the metal liner to the polar boss without exceeding the strain capability of weld joint 40.

The disclosed combination of both a pliable connection and an integral connection between metal liner 14 and polar boss 16, wherein the pliable connection is shielded from the contents of a pressure vessel, advantageously affords the above described structural and cost advantages associated with a resilient shear layer-type interface while, at the same time, providing a polar boss and an integral metal liner for positively sealing a pressure vessel.

Figure 3:
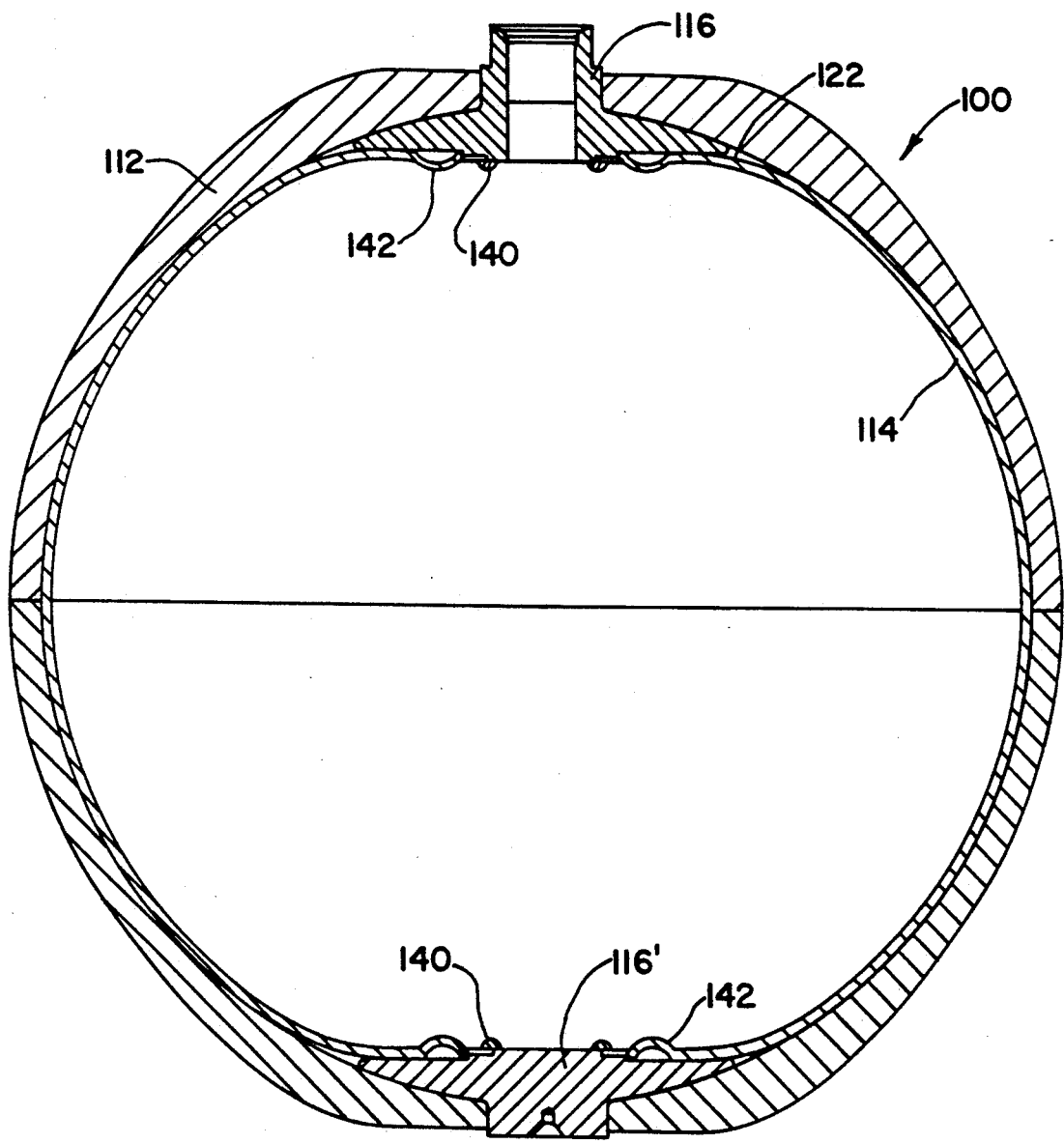
FIG. 3 is sectional view of a metal lined pressure vessel having with an integral hinge surrounding the polar opening in the liner.

An alternative embodiment of a pressure vessel is shown in FIG. 3 and is generally designated 100. Pressure vessel 100 is generally similar to pressure vessel 10 described with respect to FIG. 1 and 2 and has a composite housing defined by a fiber reinforced outer shell 112 and a metal internal liner 114. A polar boss 116 extends outwardly through an opening formed in outer shell 112, and a thin resilient shear accommodating layer 122 is interposed between the outer shell 112. A boss 116' extends through a polar opening in the outer shell axially opposite polar boss 116. Resilient shear layer 122 is adhesively bonded between metal liner 114 and each polar boss to define a pliable connection which permits relative movement between the liner and the boss during pressurization of pressure vessel 100, and the metal liner is integrally affixed to the polar boss, as at a weld joint 140, to isolate the shear layer from fluid contained in the vessel and for preventing escape of fluid between the liner and the composite shell.

Metal liner 114 has an arcuate groove which surrounds the opening at each pole of the liner and which defines a hinge 142 adjacent the weld joints 140. In addition to the relative movement permitted by shear accommodating layer 122, hinge 142 provides additional flexibility and further relieves the amount of deformation and resulting stress which is transferred to the weld zone during pressurization of vessel 100.

It will be understood that the invention may be embodied in other specific forms without departing from the spirit or central characteristics thereof. The present examples and embodiments, therefore, are to be considered in all respects as illustrative and not restrictive, and the invention is not to be limited to the details given herein.

I claim:

1. A pressure vessel comprising:
   a filament wound shell having an opening therein;
   a metal liner substantially surrounded by the shell and having an opening having a perimeter aligned with the opening in the shell;
   a boss having a tubular neck projecting outwardly through the opening in the shell and an annular flange extending radially from an end of the neck within the vessel;
   interface means comprising a thin resilient shear accommodating layer forming a pliable connection between the boss and the metal liner for relieving stress induced when the vessel is pressurized;
   said boss annular flange having a pair of axially offset grooves which define a first step for seating the perimeter of the liner opening and a second step for seating said shear accommodating layer; and
   a sealing and attachment means continuously about the opening the metal liner and affixing the metal liner to the boss for isolating said interface means from fluid contained in the vessel.

2. The pressure vessel of claim 1 in which said sealing and attachment means comprises a continuous weld.

3. The pressure vessel of claim 1 in which the resilient layer is adhesively bonded to the inner surface of the flange and to the metal liner.

4. The pressure vessel of claim 1, including second interface means forming a bias between the boss and the shell.

5. The pressure vessel of claim 4 in which the flange has an outer surface for reinforcing the perimeter of the opening in the shell, said second interface means comprising a resilient layer interposed between the outer surface of the flange and the shell.

6. The pressure vessel of claim 1 including, third interface means forming a bias between the metal liner and the shell.

7. The pressure vessel of claim 6 in which the flange has an outer surface for reinforcing the perimeter of the opening in the shell and an inner surface axially opposite the outer surface with a peripheral edge between the outer surface and the inner surface, said third interface means comprising a resilient layer interposed between the shell and the metal liner radially outward of the peripheral edge.

8. The pressure vessel of claim 1 in which the interface means comprises a layer of material selected from the group consisting of plastic, film adhesive, and elastomeric material.

9. In a pressure vessel having a composite housing defined by a metal liner substantially surrounded by a filament wound shell, the liner and the shell having aligned openings therein, each having a perimeter, and a boss having a tubular neck projecting outwardly through the opening in the shell and an annular flange extending radially from an end of the neck within the vessel, the improvement comprising:
   a pliable shear accommodating layer interface means between the liner and the boss to permit relative movement between the liner and the boss when the vessel is pressurized;
   said boss annular flange having a pair of axially offset grooves which define a first step for seating the perimeter of the liner opening and a second step for seating said shear accommodating layer; and
   a sealing and attachment means continuously about the opening in the metal liner and integrally affixing the metal liner to the boss for isolating the connection from fluid contained in the vessel.

10. The pressure vessel of claim 9 in which the sealing and attachment means comprises a weld.

11. The pressure vessel of claim 9 in which the flange has an outer surface for distributing force around the perimeter of the opening in the shell and an inner surface axially opposite the outer surface, said pliable interface means having a resilient layer interconnected between the inner surface and the metal liner, said sealing and attachment means affixing the metal liner to the inner surface at a point radially inward of a point at which the resilient layer is interconnected.

12. The pressure vessel of claim 9, including an arcuate groove surrounding the opening in the liner to define a hinge about which the liner can flex when the liner is affixed to the boss.

13. A pressure vessel comprising:
   a filament wound shell having a dome vessel end with a polar opening therein;
   a metal liner substantially surrounded by the shell and having an opening having a perimeter aligned with the polar opening in the shell;
   a boss having a tubular neck projecting outwardly through the polar opening and an annular flange extending radially from an end of the neck within the vessel, the annular flange being integral with the metal liner and defining a first step for seating the perimeter of the liner opening and a second step; and
   a shear stress relieving layer disposed in said second step, the shear stress relieving layer being interconnected between the boss and the metal liner to accommodate relative slip therebetween during pressurization of the vessel.

14. The pressure vessel of claim 13 in which the shear stress relieving layer is elastomeric material adhesively bonded to the flange and the metal liner.

15. The pressure vessel of claim 13, including a continuous weld between the metal liner and the boss around the perimeter of the opening in the liner.

* * * * *